United States Patent [19]

Böhringer

[11] 4,291,257

[45] Sep. 22, 1981

[54] REGULATED DEFLECTION CIRCUIT WITH START-UP AND ELECTRONIC CIRCUIT BREAKER CONTROL

[75] Inventor: Walter Böhringer, Schlieren, Switzerland

[73] Assignee: RCA Corporation, New York, N.Y.

[21] Appl. No.: 167,996

[22] Filed: Jul. 14, 1980

[51] Int. Cl.³ .................. H01J 29/70; H01J 29/76
[52] U.S. Cl. .................................................. 315/408
[58] Field of Search ................. 315/408, 411; 358/190

[56] References Cited

U.S. PATENT DOCUMENTS 3,876,910  4/1975  Kraus .
3,891,892  6/1975  Bohringer .
4,146,823  3/1979  Dietz .

FOREIGN PATENT DOCUMENTS 2835946  2/1979  Fed. Rep. of Germany .

OTHER PUBLICATIONS

Bohringer et al., Laboratories RCA Ltd., Zurich, Switzerland, Reports MRZ 248, 3-23-79; MRZ 240E, 4-20-78.

Hollander, Laboratories, RCA Ltd., Zurich, Switzerland, Report MRZ 243, 11-15-78.

Dobbert, *Electronic Circuit-Breaker with Surge Current Limiting for TV Receivers with a Thyristor Horizontal Deflection Stage*, ITT Technical Report, 1-9-76.

Primary Examiner—Theodore M. Blum
Attorney, Agent, or Firm—Paul J. Rasmussen; William H. Meagher; Joseph Laks

[57] ABSTRACT

A deflection generator develops scanning current in a deflection winding and produces a deflection rate alternating polarity voltage at a deflection generator terminal. A first winding of an input transformer is coupled to a source of supply frequency alternating polarity voltage and to a regulator switch for transferring energy from the source to a load circuit coupled to another winding of the input transformer. A second winding is coupled to the deflection generator terminal. The conduction time of the regulator switch controls the amount of energy transferred. A regulator control circuit turns on the regulator switch at a controlled instant within a first polarity interval of the deflection rate alternating polarity voltage to draw current in the first winding from the source. The deflection rate alternating polarity voltage applied to the second winding is reflected to the first winding and commutates off the regulator switch during the alternate polarity interval of each deflection cycle. A signal representative of variations in a deflection circuit energy level is applied to the regulator control circuit and varies the conduction time of the switch to regulate the energy level. A second controllable switch is coupled in the series path of the input current from the source of supply frequency alternating polarity voltage. A second control circuit generates a second switch turn-on signal to enable the input current to flow. During the start-up interval prior to steady-state operation of the deflection circuit, the second switch turn-on signal is generated immediately prior to the zero-crossover instants of the supply frequency alternating polarity voltage. Subsequently, the second switch turn-on signal is phase advanced from the zero-crossover instant to permit normal regulated deflection circuit operation to commence.

17 Claims, 6 Drawing Figures

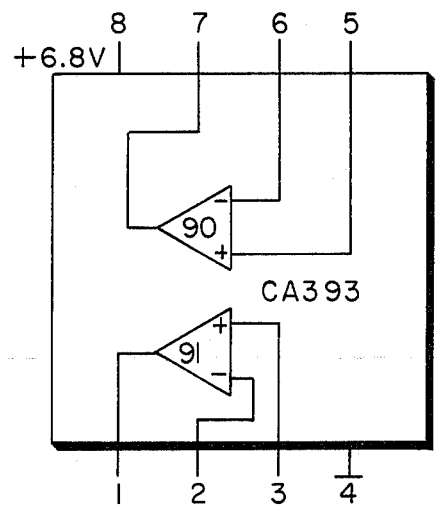
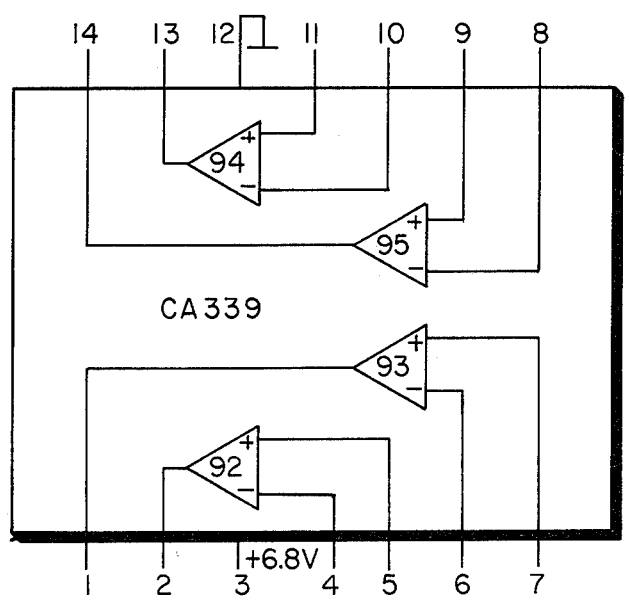
Fig. 4

4,291,257

REGULATED DEFLECTION CIRCUIT WITH START-UP AND ELECTRONIC CIRCUIT BREAKER CONTROL

This invention relates to regulated deflection circuits with start-up and electronic circuit breaker control.

Switching regulators for television receiver power supplies may conveniently provide AC power line or mains supply isolation at the input transformer of the switching regulator. For regulator switches that are synchronized with horizontal deflection, the flyback transformer may provide mains supply isolation, with the flyback transformer functioning as the switching supply input transformer. The regulator switch is located in the nonisolated section of the power supply and is coupled in series with the primary winding of the flyback transformer across the mains supply source. The horizontal deflection generator including the horizontal deflection winding is coupled to a conductively isolated secondary winding of the flyback transformer.

The regulator switch is turned on at a controlled instant within the trace interval of each horizontal deflection cycle to draw input current in the flyback transformer primary winding from the mains supply. The energy stored in the flyback transformer during conduction of the regulator switch within the horizontal trace interval is transferred during retrace to secondary winding load circuits such as the horizontal deflection generator and the high voltage ultor load.

Several techniques are available for turning off the regulator switch during each horizontal deflection cycle. In one technique, a transistor is used as the regulator switch. A control circuit provides a reverse bias voltage to the base of the transistor, either towards the end of the trace interval or during the retrace interval, to turn the transistor off. Such a regulator circuit has the disadvantage of requiring a relatively complex control circuit to maintain the transistor conducting during trace and to turn off the transistor without undue dissipation in or damage to the device during turn-off.

In another technique, a thyristor such as a silicon controlled rectifier is used as the regulator switch. A relatively simple control circuit turns on the thyristor within the trace interval. An LC commutating circuit is coupled to the thyristor and initiates a resonant current oscillation upon thyristor turn-on. The thyristor is commutated off as the resonant current provided by the commutating circuit attempts to reverse direction in the thyristor. Such a circuit has the disadvantage of using a relatively costly inductor as part of the commutating circuit.

In still another technique using a thyristor as a regulator switch, the thyristor is commutated off within the horizontal retrace interval by applying the retrace pulse voltage developed across the horizontal deflection winding to the secondary winding of the switching supply input flyback transformer. The retrace pulse voltage applied to the secondary winding of the flyback transformer reflects a resonant current to the primary winding to cause the current in the thyristor regulator switch to decrease during retrace until the thyristor is commutated off as the current therein attempts to reverse direction. An oppositely-poled diode may be coupled in parallel with the thyristor to return to the mains supply source any remaining energy stored in the flyback transformer after the thyristor is commutated off.

When using a thyristor as a regulator switch that is commutated off by a reflected retrace pulse, additional circuitry is desirable for slow start-up of the regulated deflection circuit and for electronic circuit breaker operation during overload and short-circuit conditions. A slow start mode of operation is desirable upon initial energization of the regulated deflection circuit because the retrace pulse voltage used to commutate off the thyristor switch is initially absent or of too low an amplitude. An electronic circuit breaker function is desirable to disable the regulator during short-circuit and overload conditions when the retrace pulse voltage is absent or unable to properly commutate off the regulator switch thyristor.

A feature of the invention is to provide slow or soft start regulator circuit operation by coupling a second controllable switch in the series path of the input current to the flyback transformer primary winding. During a first portion of the start-up interval after initial energization of the deflection circuit but prior to steady-state operation, the second controllable switch is turned on immediately prior to a zero-crossover instant within each cycle of the supply frequency alternating polarity or mains supply voltage. The second switch turn-on signals are then phase advanced from the zero-crossover instant during the transition from start-up to steady-state power supply and deflection circuit operation to enable greater amounts of input current to flow from the AC mains supply under normal steady-state deflection circuit operation.

A second feature of the invention is a circuit which inhibits the generation of the second switch turn-on signals for a predetermined interval upon initiation of the start-up interval. Such an inhibit interval is desirable to prevent transient voltages generated after the initial energization of the deflection circuit from improperly turning on the second switch at instants other than near the zero-crossover instant. In a specific embodiment, the output of a flip-flop having two output state voltages is applied to the control circuit of the second switch. Upon initiation of the start-up interval, the flip-flop develops the first output state voltage and inhibits the generation of the second switch turn-on signal. After the elapse of a predetermined interval from start-up initiation, the flip-flop changes output states and applies the second output voltage to the second switch control circuit to enable the generation of the second switch turn-on signal.

Another feature of the invention is to apply a deflection rate signal to the second switch control circuit during steady-state operation of the deflection circuit so as to generate the second switch turn-on signal during each cycle of horizontal deflection, thereby ensuring the turn-on of the second switch as soon as the mains supply voltage permits forward conduction through the switch.

Still another feature of the invention is to enable the second switch to function as an electronic circuit breaker to block the flow of input current from the mains supply during deflection circuit overload or short-circuit conditions during steady-state operation. A signal representative of the amplitude of the deflection rate voltage, such as a retrace pulse voltage, used to vary the regulator switch turn-on instant, is sensed by the electronic circuit breaker circuit. A sharp transition occurring in the sensed signal, which indicates that an overload or short-circuit condition has occurred, trips the circuit breaker. The inhibit flip-flop switches back to the first output state voltage, thereby preventing the second switch turn-on signal from being generated and thereby blocking the flow of input current.

Still another feature of the invention is to precharge the trace capacitor or the DC blocking capacitor that is coupled to the deflection generator coupled flyback transformer secondary winding. The trace or DC blocking capacitor is precharged prior to the initial conduction of the regulator switch so as to enable the generation of minimum amplitude retrace pulses for commutating off the regulator switch during start-up.

FIG. 4 illustrates the pin terminal connection of two conventional integrated circuits used when implementing the circuit of FIG. 3;

Figure 1:
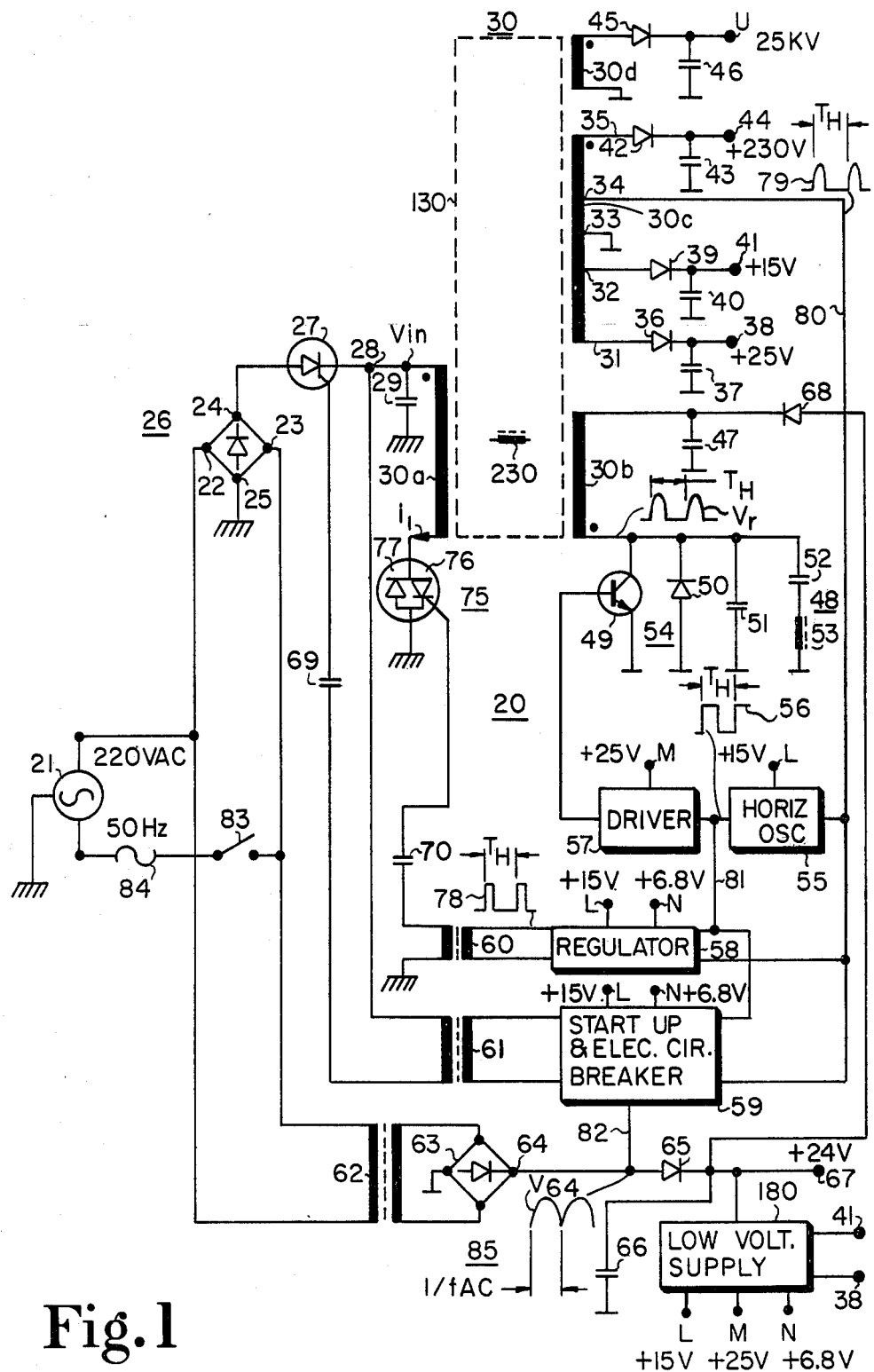
FIG. 1 illustrates a regulated deflection circuit with start-up and electronic circuit breaker control embodying the invention.

In a television receiver regulated horizontal deflection circuit 20, illustrated in FIG. 1, a source of supply frequency alternating polarity voltage 21, such as a 220 volt AC, 50 Hz, mains supply, is coupled across input terminals 22 and 23 of a full-wave bridge rectifier 26. A fuse 84 and a mechanical on-off switch 83 are coupled between source 21 and terminal 23. A terminal 25 of full-wave bridge rectifier 26 comprises the current return or earth ground terminal in common with the earth ground of mains supply 21. An output terminal 24 of full-wave bridge rectifier 26 is coupled through the anode-to-cathode path of a controllable switch, SCR 27, to an end terminal 28 of the primary winding 30a of an input transformer 30. A filter capacitor 29 is coupled to supply terminal 28 to develop a filtered but unregulated DC input voltage Vin at terminal 28. The other end terminal of input transformer winding 30a is coupled to the anode of a controllable regulator switch SCR 76. The cathode of SCR 76 is coupled to earth ground. Parallelly coupled with SCR 76, but oppositely poled, is a diode 77. SCR 76 and diode 77 may comprise a single semiconductor element 75 such as an integrated thyristor-rectifier (ITR).

Input transformer 30 may comprise a horizontal output or flyback transformer with a rectangular core 130. Primary winding 30a is wound around one leg of rectangular core 130 and secondary windings 30b–30d may be wound around the opposite leg. With the windings of flyback transformer 30 so situated, a substantial leakage inductance 230, due to loose magnetic coupling, exists between primary winding 30a and each of the secondary windings 30b–30d. By concentrically winding all of the secondary windings, for example, the secondary windings are relatively tightly coupled to each other magnetically and a relatively small leakage inductance exists between any two of the secondary windings.

An end terminal of flyback transformer secondary winding 30b is coupled to a horizontal deflection generator 48 at the collector of a horizontal output transistor 49. A DC blocking capacitor 47 is coupled to the other end terminal of secondary winding 30b. Horizontal deflection generator 48 comprises the series arrangement of a horizontal deflection winding 53 and an S-shaping or trace capacitor 52, a retrace capacitor 51, and a trace switch 54 comprising horizontal output transistor 49 and a damper diode 50. A conventional horizontal oscillator 55 provides a square-wave switching voltage 56, repeating at the horizontal deflection frequency, $1/T_H$, to a horizontal driver 57 for switching horizontal output transistor 49 into conduction within the horizontal trace interval of each deflection cycle and for cutting off the output transistor to initiate the horizontal retrace interval. A +15 volt DC supply voltage is applied to horizontal oscillator 55 at a terminal L and a +25 volt DC supply voltage is applied to horizontal driver 57 at a terminal M.

The retrace pulse voltage Vr developed by deflection generator 48 at the collector of horizontal output transistor 49 is applied to flyback transformer secondary winding 30b, stepped up in voltage by high voltage secondary winding 30d, rectified by a diode 45 and filtered by a capacitor 46 to develop an ultor accelerating potential at a terminal U for the ultor load, not shown, of a television receiver picture tube. The retrace pulse voltage developed in flyback transformer secondary winding 30c is rectified by a diode 42 that is coupled to an end conductor lead 35 and filtered by a capacitor 43 to develop a +230 volt DC supply voltage at a terminal 44. The voltage developed across flyback transformer winding 30c is rectified during the trace interval by a diode 36 that is coupled to the other end conductor lead 31 and is filtered by a capacitor 37 to develop a +25 volt DC supply voltage at a terminal 38. A rectifier 39 is coupled to a tap terminal 32 of secondary winding 30c to develop a +15 volt DC supply voltage at a terminal 41 after filtering by a capacitor 40. A tap terminal 33 is coupled to a chassis ground conductively isolated from the mains supply earth ground.

A separate mains rectified auxiliary power supply 85, comprising an auxiliary mains supply transformer 62, a bridge rectifier 63, a diode 65 and a filter capacitor 66, provides +24 volts DC at a terminal 67. The +24 volts DC is used as a start-up supply, as will be explained, and also powers, for example, a high wattage audio circuit, not illustrated in FIG. 1.

During normal steady-state operation of deflection circuit 20, energy is transferred from mains supply 21 to the various load circuits coupled to the secondary windings of flyback transformer 30 including load circuits such as the ultor load and the horizontal deflection generator 48. Regulator SCR 76 is gated into conduction at a controlled instant within the trace interval of each horizontal deflection cycle by a gating pulse 78 developed by a regulator circuit 58. The gating pulse 78 is coupled by a transformer 60 to the gate of the SCR through a capacitor 70.

When SCR 76 is gated into conduction, a primary winding current $i_1$ flows in flyback transformer winding 30a and in SCR 76. To regulate a deflection circuit energy level, such as the retrace pulse amplitude Vr, the turn-on instant of SCR 76 and, thus, its conduction time, is varied by regulator control circuit 58 in response to variations of the deflection circuit energy level as represented by the retrace pulse 79 developed at a tap terminal 34 of secondary winding 30c and applied to the regulator control circuit along a conductor line 80. Operation of regulator circuit 58 is synchronized with horizontal deflection during start-up by applying to the regulator along a conductor line 81 the square-wave voltage 56 developed by horizontal oscillator 55, and is synchronized during steady-state operation by the applied retrace pulse 79.

Figure 2:
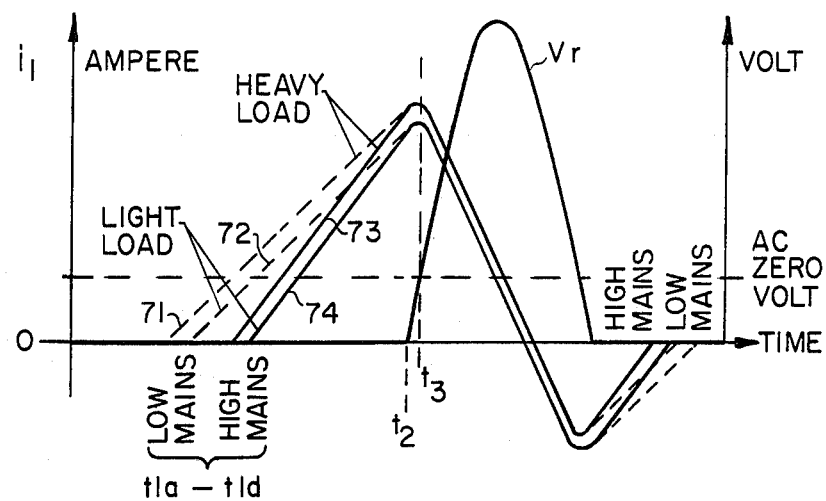
FIG. 2 illustrates waveforms associated with the operation of the circuit of FIG. 1.

As illustrated in FIG. 2, the turn-on instant of regulator SCR 76 within the interval tla-tld is varied during the horizontal trace interval under varying load and mains supply conditions to produce waveforms such as waveforms 71–74 representing the current $i_1$ flowing in primary winding 30a and ITR 75. The turn-on of SCR 76 varies from the instant tla for waveform 71 to the instant tld for waveform 74. In general, the current $i_1$ increases from the turn-on instant of the SCR until the instant t3 within the retrace interval is reached. The retrace pulse voltage Vr that is developed at the collector of horizontal output transistor 49 beginning at time t2 is applied to flyback transformer secondary winding 30b to reflect a resonating current to primary winding 30a such that the current $i_1$ in winding 30a begins to decrease in a resonant manner beginning at time t3. Near the center of the horizontal retrace interval, the current $i_1$ reverses direction and commutates off SCR 76. The negative current $i_1$ is then taken up by diode 77 to return energy to supply terminal 28. After termination of the retrace interval, the current $i_1$ agains flows as a positive-going but negatively-valued ramp until the zero current level is reached, at which time diode 77 is commutated off and the ITR becomes open-circuited.

Energy is transferred by way of flyback transformer 30 to the secondary winding coupled load circuits such as the ultor load during the horizontal retrace interval, as indicated by the peak magnitude of the positive current $i_1$ near the beginning of horizontal retrace being greater than the peak magnitude of the negative current near the end of horizontal retrace. The energy transferred during horizontal retrace is stored in the leakage inductance 230 of flyback transformer 30. Flyback transformer 30 is designed to provide sufficient leakage inductance to store all the required energy that is to be transferred under normal deflection circuit operation while still enabling the current $i_1$ to become negative during horizontal retrace in order to commutate off SCR 76. The amount of energy stored and transferred is a function of the conduction time of SCR 76 and ITR 75.

A feature of the invention is to ensure proper commutation of regulator SCR 76 during the start-up interval after closure of on-off switch 83 when the retrace pulse voltage Vr is absent or is of insufficient amplitude to reflect sufficient resonant current to primary winding 30a for commutation purposes. The start-up circuit for deflection circuit 20 includes SCR 27 and a control circuit 59 for providing turn-on gating pulses to SCR 27 by way of a transformer 61 and a capacitor 69.

DC blocking capacitor 47 and trace capacitor 52 are precharged through a diode 68 from the 24 volt supply terminal 67 of auxiliary supply 85 prior to the initial conduction of regulator SCR 76. This precharging enables the immediate generation of relatively low amplitude retrace pulses Vr when horizontal oscillator 55 begins to provide the square-wave switching voltage 56. The current $i_1$ in primary winding 30a is maintained at a relatively small value in order to permit the low amplitude retrace pulse voltage Vr during start-up to commutate off regulator SCR 76.

To maintain a low amplitude to the current $i_1$ during start-up, the input voltage Vin is made to increase relatively slowly during the start-up interval. SCR 27 is coupled in the series circuit path for input current from the AC mains supply 21 to primary winding 30a. Control circuit 59 initially provides gating pulses to SCR 27 immediately prior to the zero-crossover instants of the alternating polarity mains supply voltage. To synchronize operation of control circuit 59 with the alternating polarity mains supply voltage, the full-wave rectified mains voltage $V_{64}$, repeating at twice the mains supply frequency $f_{AC}$, is applied to control circuit 59 from terminal 64 along a conductor line 82.

By turning on SCR 27 immediately prior to the zero-crossover instants of the mains supply voltage, the conduction time of SCR 27 is kept relatively short. A relatively small amount of input current flows from mains supply 21, resulting in a relatively low input voltage Vin being developed at terminal 28 and a relatively small current $i_1$ flowing in primary winding 30a. SCR 76 can therefore be commutated off during the start-up interval when the retrace pulse voltage amplitude is relatively small. Control circuit 59 then phase advances the gating of SCR 27 away from the zero-crossover instants during the transition from start-up to steady-state operation to enable greater amounts of input current to flow and to bring up the input voltage Vin to its steady-state value.

Another feature of the invention is to combine an electronic circuit breaker function with the start-up function of SCR 27. If a flyback transformer secondary winding coupled load, such as the ultor load, short circuits and substantially reduces the amplitude of the retrace pulse voltage Vr, or if, for example, deflection generator 48 malfunctions and fails to generate a retrace pulse voltage, regulator SCR 76 will not be commutated off. To prevent the current $i_1$ in flyback transformer primary winding 30a from increasing to prohibitive values under a short-circuited secondary load condition or a malfunctioning deflection generator condition, a retrace pulse voltage 79 is applied to control circuit 59 along conductor line 80. Control circuit 59 prevents the generation of gating pulses to SCR 27 when sensing a negative-going transient produced by the collapse of retrace pulse voltage 79. The input current path to primary winding 30a from mains supply 21 is then opened up, thereby disabling normal deflection circuit operation.

After normal deflection circuit operation is disabled, the start-up portion of control circuit 59 again turns on SCR 27 immediately prior to the zero-crossover instants of the mains supply voltage to repeat the slow start sequence. Should the fault condition persist, the disabling circuit portion of control circuit 59 will again be activated to disable deflection circuit 20. Operation of deflection circuit 20 under a persistent fault condition will cycle between start-up and disabling modes of operation until fuse 84 opens up and maintains the deflection circuit disabled.

During the steady-state operation of deflection circuit 20, control circuit 59 applies a gating pulse to SCR 27 once each horizontal deflection cycle in response to the horizontal deflection rate square-wave voltage 56 applied to control circuit 59 along conductor line 81. By providing a turn-on gating signal to SCR 27 each deflection cycle, conduction of the SCR is assured as soon as the anode potential of the SCR exceeds the cathode potential.

Figure 3:
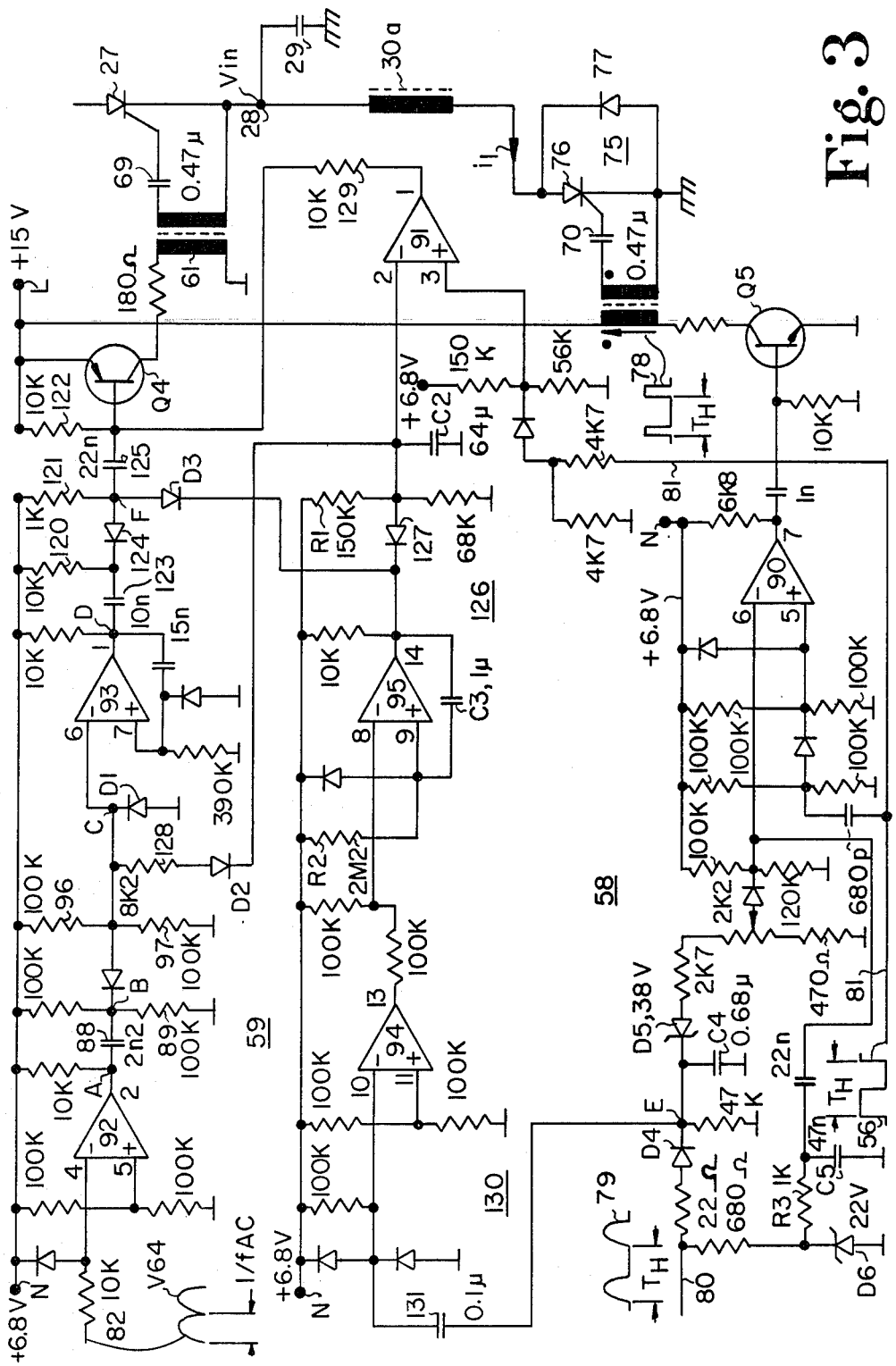
FIG. 3 illustrates a portion of the circuit of FIG. 1 including detailed embodiments of the regulator, start-up and electronic circuit breaker circuits.

FIG. 3 illustrates a portion of the circuit of FIG. 1 including detailed embodiments of regulator control circuit 58 and the start-up and electronic circuit breaker control circuit 59. A 15 volt DC voltage at terminal L and a 6.8 volt DC voltage at a terminal N provide supply rail operating voltages for the two control circuits.

Under normal, steady-state deflection circuit operation, a driver transistor Q5 within regulator control circuit 58 is switched on at a controlled instant within the trace interval of each deflection cycle to produce gating pulses 78 to turn on regulator SCR 76. The exact turn-on instant of transistor Q5 is determined by the triggering of a comparator 90 in accordance with variations in the amplitude of retrace pulse 79 applied to regulator control circuit 58 along conductor line 80.

During the start-up interval, after closure of on-off switch 83, comparator 90 is triggered by the leading or positive-going edge of the horizontal deflection rate square-wave voltage 56 obtained from horizontal oscillator 55 and applied to input pin 5 of comparator 90 after first being differentiated. The leading edge of square-wave voltage 56 is also used to turn off horizontal output transistor 49. Thus, during start-up, the turn-on of regulator SCR 76 occurs near the end of the horizontal trace interval.

As the deflection current steadily increases during the start-up interval, the amplitude of the horizontal retrace pulses 79 applied along conductor line 80 also increases. A horizontal rate sawtooth voltage is developed at input pin 6 of comparator 90. This sawtooth voltage is obtained by the integration of flyback pulses 79 by resistor R3 and capacitor C5 after being square-wave shaped by a zener diode D6. The sawtooth voltage at pin 6 of comparator 90 advances the triggering of the comparator and the turn-on of SCR 76 relative to the turn-on instant produced by the leading edge of square-wave voltage 56. SCR 76 gradually conducts longer, and increasingly greater amounts of energy are transferred to the flyback transformer secondary winding coupled load circuits until a steady-state equilibrium condition has been achieved.

During steady-state operation, a diode D4 rectifies retrace pulse 79 to produce a DC control voltage at a terminal E across a capacitor C4. The DC control voltage varies with retrace pulse amplitude variations. The DC control voltage is level shifted by a zener diode D5 and combined with the sawtooth voltage at pin 6 of comparator 90 to vary the triggering of comparator 90 and the turn-on of SCR 76 so as to maintain the retrace pulse voltage amplitude relatively constant.

Figure 5:
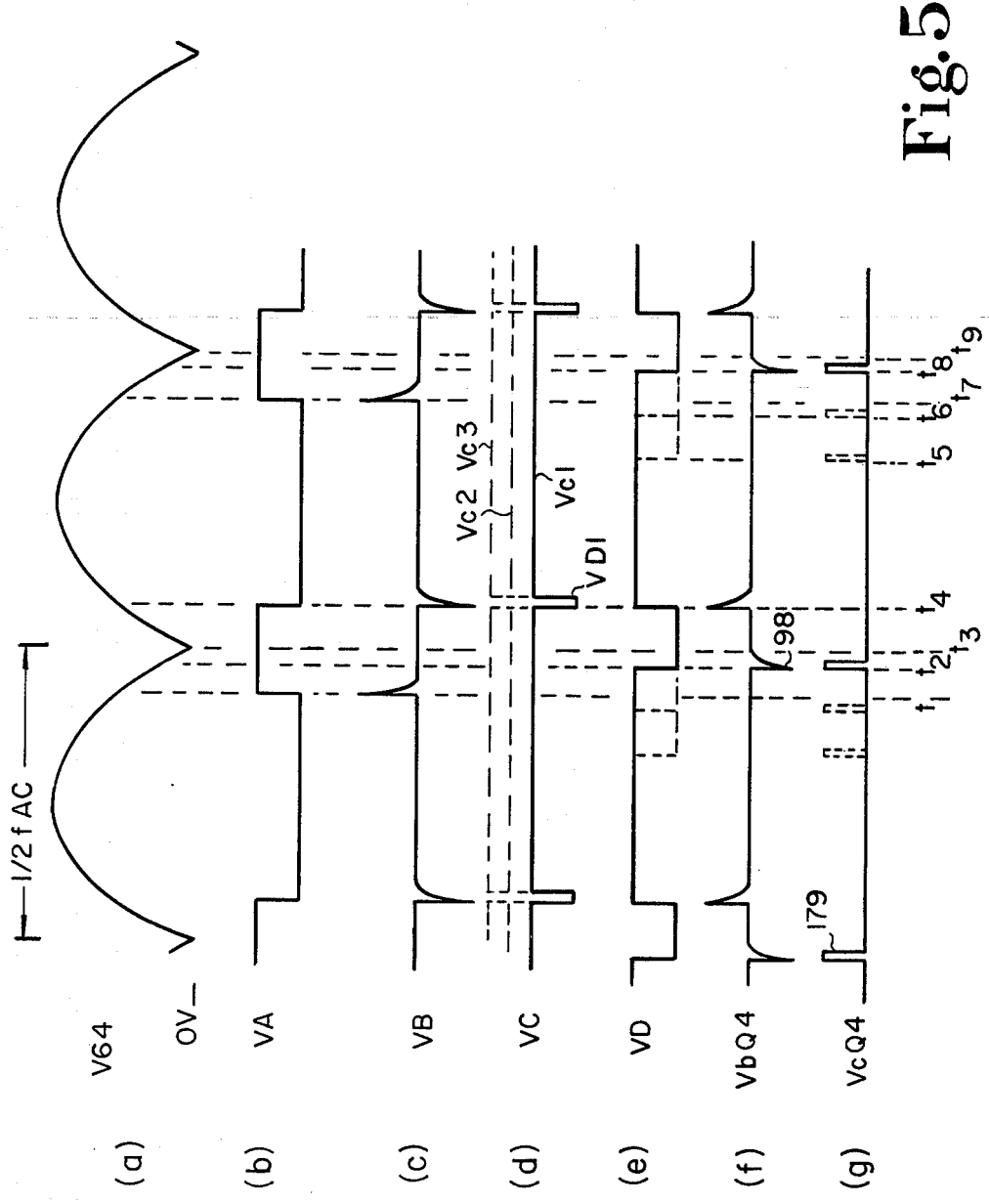
FIG. 5 illustrates waveforms associated with the operation of the circuit of FIG. 3.

To provide for the slow increase in the input voltage Vin, start-up control circuit 59 initially turns on SCR 27 immediately prior to the zero-crossover instants of the mains supply voltage. The full-wave rectified mains supply voltage $V_{64}$, illustrated in FIG. 5a, is applied to an input pin 4 of a comparator 92. Comparator 92 inverts and limits the rectified mains supply voltage to produce a square-wave voltage $V_A$, illustrated in FIG. 5b, at a terminal A, the output pin 2 of comparator 92. The positive portion of square-wave voltage $V_A$ occurs between times $t_1$–$t_4$ encompassing the zero-crossover instant $t_3$ of the full-wave rectified mains supply voltage $V_{64}$.

Square-wave voltage $V_A$ is differentiated by a capacitor 88 and a resistor 89 to produce the voltage $V_B$ across resistor 89 at a terminal B, as illustrated in FIG. 5c. The negative differentiated spike portion of the voltage $V_B$ occurring at the trailing edge of the square-wave voltage $V_A$ at time $t_4$ is applied to an input pin 6 of a monostable 93, at a terminal C. The voltage at pin 6 of monostable 93 is square-wave shaped by a diode D1 to produce the negative pulse voltage $V_{D1}$ at time $t_4$, illustrated in FIG. 5d. The negative-going edge of the pulse $V_{D1}$ causes the monostable to switch output state voltages at output pin 1, at a terminal D. As illustrated in FIG. 5e, the voltage $V_D$ at terminal D goes high at time $t_4$.

The output of monostable 93 remains high for a predetermined interval $t_4$–$t_8$ of FIG. 5e. The duration $t_4$–$t_8$ of the unstable high output state of monostable 93 is determined by the voltage $V_{C1}$ developed at input pin 6 of monostable 93 after the occurrence of the negative pulse $V_{D1}$, as illustrated in FIGS. 5d and 5e. During the occurrence of the first several gating pulses for SCR 27, the voltage at pin 6 of monostable 93 is determined by the values of voltage dividing resistors 96 and 97 in parallel with resistor 128. These values are selected to enable monostable 93 to switch back to its stable low state at the instant $t_2$ or $t_8$, an instant immediately prior to the zero-crossover instant $t_3$ or $t_9$ of the voltage $V_{64}$, as illustrated in FIGS. 5a and 5e.

The negative-going edge at time $t_2$ or $t_8$ of the resultant square-wave output voltage $V_D$ of monostable 93 is differentiated by the network 120–125 to apply a negative spike voltage 98 to the base of a driver transistor Q4 to turn the transistor on, as illustrated by the base voltage $V_{bQ4}$ and by the collector voltage $V_{cQ4}$ of FIGS. 5f and 5g. The resulant pulsed collector voltage comprises the gating pulses 179 of FIG. 5g. Pulses 179 are applied through transformer 61 to turn on SCR 27 at times $t_2$ and $t_8$ immediately prior to zero-crossover instants $t_3$ and $t_9$ of the full-wave rectified AC mains voltage $V_{64}$, as required to provide slow start-up operation of deflection circuit 20.

Upon initial energization of horizontal deflection circuit 20 of FIG. 1, when on-off switch 83 is closed, undesirable transient voltages may be developed which can spuriously trigger SCR 27 at instants other than near the zero-crossover instants of the mains supply voltage. An inhibit circuit 126, illustrated in FIG. 3, is included in the control circuit 59 of SCR 27. Inhibit circuit 126 disables the output of monostable 93, thereby preventing transistor Q4 from turning on and triggering SCR 27. Inhibit circuit 126 is activated for a predetermined interval, typically around 0.5 to 1 second. After the elapse of this inhibit interval, the output of monostable 93 is no longer disabled, thereby permitting the triggering of SCR 27 immediately prior to a zero-crossover instant of the mains supply voltage.

Inhibit circuit 126 comprises a flip-flop 95 having an output pin 14 coupled to the output path of monostable 93 by way of a diode D3. Immediately after closure of on-off switch 83, the output of flip-flop 95 is low or grounded, thereby grounding terminal F which is coupled to the anode of diode D3. SCR 27 cannot be triggered as long as output pin 14 of flip-flop 95 is in the ground state.

After approximately 0.8 second, as determined by the time constant of a resistor R2 and a capacitor C3, capacitor C3 has charged sufficiently to raise the voltage at input pin 9 of flip-flop 95 to a value that will cause flip-flop 95 to change output states at pin 14. Diode D3 becomes reverse biased and the output of monostable 93 is now permitted to turn on transistor Q4 and trigger SCR 27.

During the 0.8 second inhibit interval when the output pin 14 of flip-flop 95 is grounded, a capacitor C2, coupled to output pin 14 through a diode 127, is maintained in a discharged state. After the elapse of the inhibit interval, output pin 14 goes high, reverse biasing diode 127 and permitting capacitor C2 to charge from the 6.8 volt supply rail through a resistor R1. The increasing voltage across capacitor C2 is applied to input pin 6 of monostable 93 through a diode D2 and a resistor 128. Since the duration of the unstable high output state of monostable 93 is a function of the voltage $V_C$ at pin 6 of monostable 93, increasing the voltage $V_C$ by charging capacitor C2 results in the shortening of the unstable high output state at terminal D.

As illustrated in FIG. 5d, as capacitor C2 charges, the voltage $V_C$ at pin 6 of monostable 93 continuously increases from the value $V_{C1}$ to the value $V_{C2}$ and then to the value $V_{C3}$. As illustrated in FIGS. 5e and 5g, because of the increasing voltage applied by capacitor C2 to input pin 6 of monostable 93, the duration of the unstable high state of monostable 93 shortens. The output of monostable 93 returns to its stable low state at a continuously advancing instant such as the advanced instant $t_6$ and then the advanced instant $t_5$, resulting in the continuous phase advance of the triggering of SCR 27 away from near the zero-crossover instant to the instant $t_6$, for example, and then to the instant $t_5$.

As the triggering instant of SCR 27 phase advances, increasingly greater amounts of input current flow from mains supply 21 through SCR 27 to charge capacitor 29 to provide a slowly increasing voltage Vin, as is required for soft start-up operation of deflection circuit 20.

As the input voltage Vin approaches its steady-state level, a trigger comparator 91 is enabled and switches transistor Q4 into conduction each horizontal deflection cycle to trigger SCR 25 into conduction each deflection cycle. An output pin 1 of comparator 91 is coupled to the base of transistor Q4 through a resistor 129. The horizontal deflection rate square-wave switching voltage 56 is applied to the positive input pin terminal 3 of comparator 91 along conductor line 81. The increasing voltage developed across capacitor C2 is applied to the inverting input pin 2 of comparator 91.

As the voltage across capacitor C2 reaches its steady-state level, the voltage applied to inverting pin 2 of comparator 91 is sufficiently great to trigger the comparator into the low output state upon the occurrence of the negative-going edge of the horizontal deflection rate square-wave voltage 56. When the output of comparator 91 goes low, transistor Q4 is turned on, thereby triggering SCR 27 into conduction. Triggering SCR 27 at a horizontal rate as steady-state conditions are approached ensures the optimal triggering of the SCR as soon as the full-wave rectified mains supply voltage $V_{64}$ applied to the anode of SCR 27 exceeds the SCR cathode potential.

The low voltage power supply 180 of FIG. 1 provides +15 volts DC and +25 volts DC at terminals L and M, respectively, for energizing horizontal oscillator 55, horizontal driver 57, regulator 58 and start-up and electronic circuit breaker 59 during start-up. Power supply 180 also provides +6.8 volts DC at terminal N for energizing circuits 58 and 59 both during start-up and steady-state operation.

Figure 6:
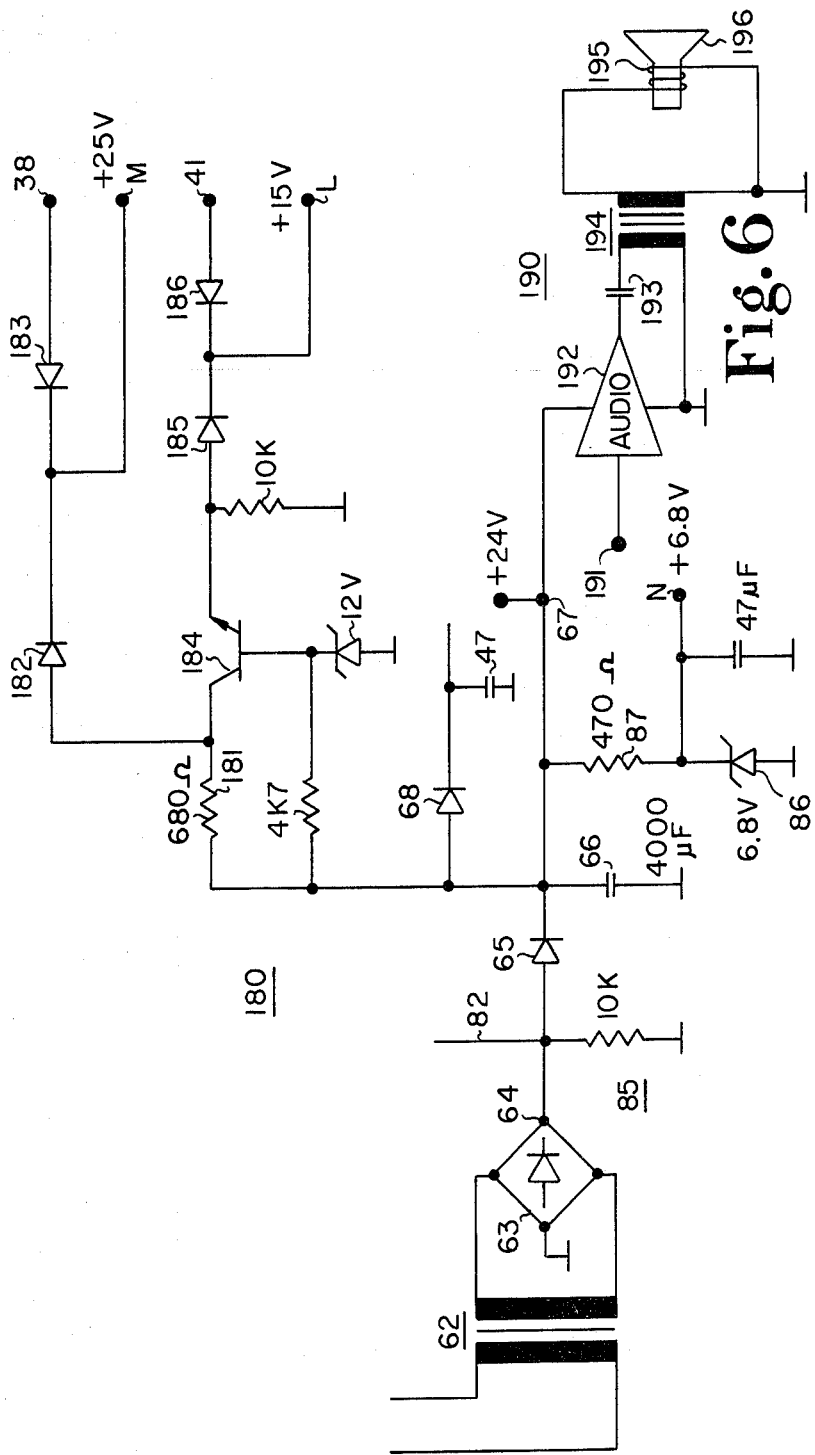
FIG. 6 illustrates a detailed embodiment of the low voltage power supply circuit portion of FIG. 1.
Figure 3:
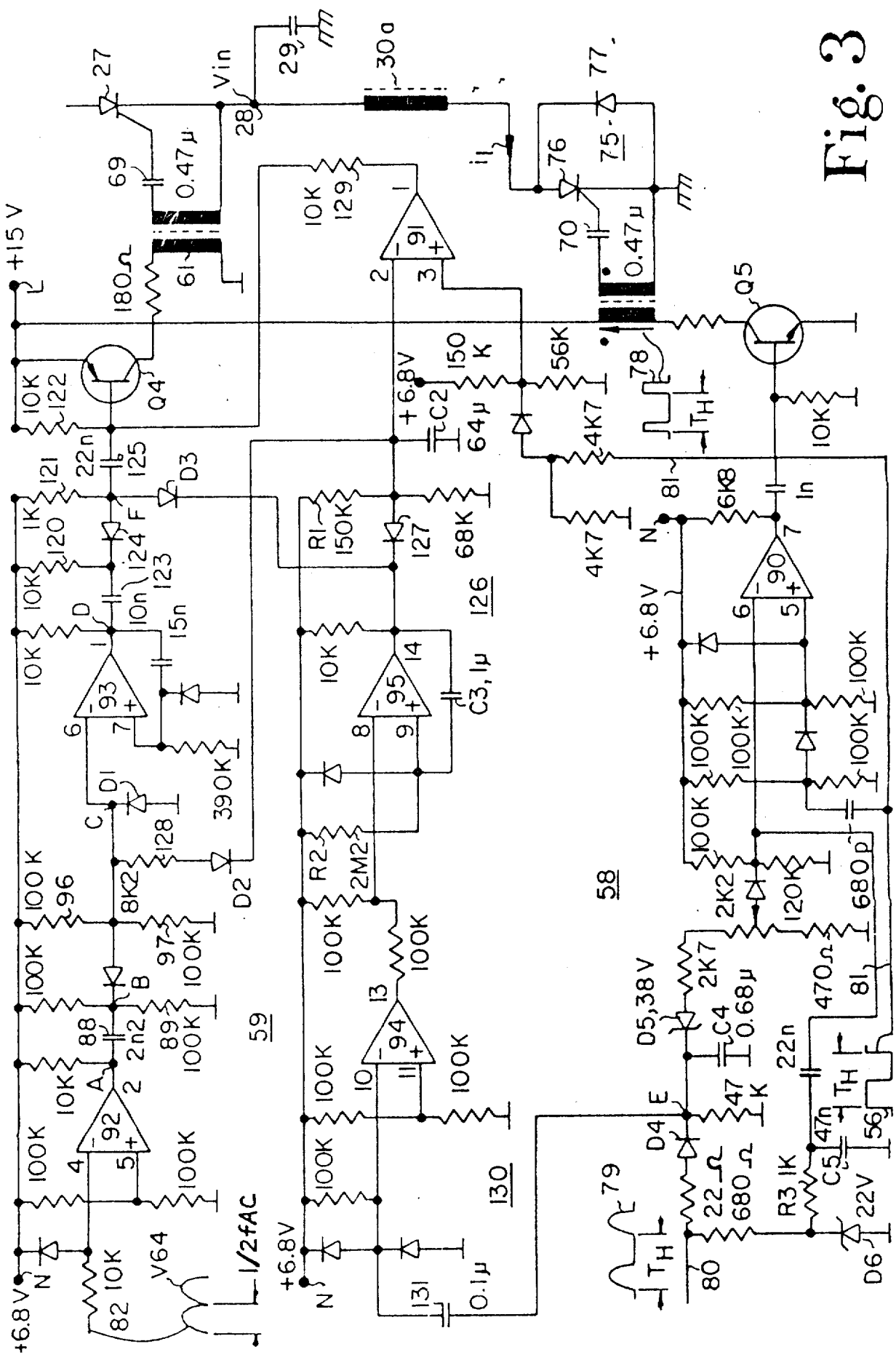

A detailed embodiment of power supply 180 is illustrated in FIG. 6. A zener diode 86 maintains the voltage at terminal N at +6.8 volts DC. Zener bias is obtained through a resistor 87 from the +24 volts DC at terminal 67 developed by auxiliary power supply 85.

During start-up, the +24 volts at terminal 67 is applied to terminal M through a resistor 181 and a diode 182. The start-up voltage at terminal M, although less than the steady-state terminal M voltage of +25 volts DC, is sufficient to energize horizontal driver 57 into operation. During steady-state operation, flyback transformer 30 of FIG. 1 provides +25 volts DC at terminal M of FIG. 6 through terminal 38 and a diode 183. During steady-state operation, diode 182 is reverse biased, disconnecting auxiliary power supply 85 from terminal M.

Also, during start-up, the +24 volts at terminal 67 is applied to terminal L through resistor 181, a transistor 184 and a diode 185. The start-up voltage at terminal L, although less than the steady-state terminal L voltage of +15 volts DC, is sufficient to energize horizontal oscillator 55, regulator 58 and start-up and electronic circuit breaker 59 into operation. During steady-state operation, the flyback transformer derived voltage of +15 volts DC developed at terminal 41 is applied through a diode 186 to reverse bias diode 185 and to establish the +15 volts steady-state DC voltage at terminal L.

As indicated previously, the +24 volts DC at terminal 67 power a high wattage audio circuit, illustrated in FIG. 6 as the audio circuit 190. Audio circuit 190 comprises an audio amplifier 192 with an output terminal AC coupled through a capacitor 193 to the primary winding of a coupling transformer 194. The secondary winding of transformer 194 is coupled to the voice coil 195 of a loudspeaker 196. Audio frequency signals are applied to input terminal 191 of audio amplifier 192. These signals are amplified by audio amplifier 192 to generate current in voice coil 195, thereby producing sound emanations from loudspeaker 196 in accordance with the sound information content of the signals.

Audio load circuit 190 may be a relatively high wattage load, consuming, illustratively, 10-20 watts power. If audio load circuit 190 were to draw its load current from a flyback transformer secondary winding supply voltage, such as from terminal 38, substantial undesirable retrace pulse voltage modulation may occur due to variations in load current being drawn from the flyback transformer secondary winding. These load current variations may be the result of sound content changes in the audio input signals applied to terminal 191. To avoid undesirable audio retrace pulse modulation, the +24 volt DC supply is provided by the same auxiliary power supply 85 as is used to precharge DC blocking capacitor 47. The audio load current is now drawn from the mains supply source through auxiliary transformer 62 rather than through flyback transformer 30.

Short-circuit, overload and deflection generator malfunction protection is provided by a shutdown circuit 130 incorporated into the control circuit 59 of SCR 27 and illustrated in FIG. 3. A trigger comparator 94 has its output pin 13 coupled to input pin 8 of flip-flop 95. The inverting input pin 10 of trigger comparator 94 is coupled through a capacitor 131 to terminal E. The voltage at terminal E represents the rectified retrace pulse voltage amplitude.

If the regulator ITR 75 short circuits, or if the ultor load short circuits due to picture tube arcing, or if deflection generator 48 malfunctions and fails to produce retrace pulse voltages, the voltage at terminal E decreases to zero. Trigger comparator 94 senses the collapsing voltage at terminal E and switches to the high output state, thereby triggering flip-flop 95 into the low output state. When the output of flip-flop 95 is low or grounded, capacitor C2 is discharged, disabling the operation of both monostable 93 and trigger comparator 91. Transistor Q4 cannot be turned on, thereby removing trigger pulses from SCR 27 and maintaining the SCR in the off state. The input voltage Vin is removed, thereby disabling and shutting down operation of horizontal deflection circuit 20. After shutdown, the start-up sequence for horizontal deflection circuit 20 is reinitiated. If the fault condition persists, shutdown will again occur and eventually fuse 84 will open.

Comparators 90–92 and 94, monostable 93 and flip-flop 95 may be obtained from conventional integrated circuit packages. As illustrated in FIG. 4, comparators 90 and 91 may be obtained from the integrated circuit package CA393, manufactured by RCA Corporation, Somerville, N.J., or from the package LM393, manufacture by National Semiconductor Corporation, Santa Clara, Calif., with the output pins connected as indicated in FIGS. 3 and 4. Comparators 92 and 94, monostable 93, and flip-flop 95 may be obtained from the integrated circuit package CA339, manufactured by RCA Corporation, or from the package LM339, manufactured by National Semiconductor Corporation.

What is claimed is:

1. A regulated deflection circuit with start-up circuitry, comprising:
    a deflection winding;
    a deflection generator coupled to said deflection winding for generating scanning current in said deflection winding, a deflection rate voltage with an alternating polarity component voltage being developed at a deflection generator terminal;
    a source of supply frequency alternating polarity voltage;
    a controllable regulator switch;
    an input transformer with first and second windings, said first winding being coupled to said source and to said regulator switch for transferring energy from said source to a load circuit coupled to a winding of said input transformer other than said first winding in accordance with the conduction time of said regulator switch, said second winding being coupled to said deflection generator terminal;
    a regulator control circuit coupled to said regulator switch for turning on said regulator switch at a controlled instant within a first polarity interval of said deflection rate alternating polarity component voltage to draw current in said first winding from said source, said deflection rate alternating polarity component voltage being applied to said second winding for reflecting a resonant current to said first winding to commutate off said regulator switch during the alternate polarity interval;
    means for developing a signal representative of variations of a deflection circuit energy level;
    means for applying said deflection circuit energy level variations representative signal to said regulator control circuit to vary said conduction time of said regulator switch with deflection circuit energy level variations;
    a second controllable switch coupled in the path of current from said source to said first winding of said input transformer;
    a second control circuit coupled to said second switch for generating a second switch turn-on signal to enable current from said source to flow in said first winding of said input transformer;
    means coupled to said second control circuit and responsive to said supply frequency alternating polarity voltage for enabling said second control circuit to generate said second switch turn-on signal at an instant prior to a zero-crossover instant within a cycle of said supply frequency alternating polarity voltage during deflection circuit start-up prior to steady-state operation; and
    means for phase advancing the occurrence of said second switch turn-on signal from said zero-crossover instant during the transition from start-up to steady-state operation.

2. A circuit according to claim 1 including means for inhibiting the generation of said second switch turn-on signal for a predetermined inhibit interval upon initiation of deflection circuit start-up.

3. A circuit according to claim 2 including means responsive to said deflection rate voltage during steady-state operation of said deflection circuit for disabling generation of said second switch turn-on signal when sensing a decrease in amplitude of said deflection rate voltage below a predetermined level.

4. A circuit according to claim 3 including means for applying a deflection rate signal to said second control circuit during steady-state operation of said deflection circuit to generate said second switch turn-on signal within each cycle of said deflection rate voltage.

5. A circuit according to claim 3 wherein said inhibiting means comprises a flip-flop having two output state voltages, the first output state voltage when applied to said second control circuit inhibiting the generation of said second switch turn-on signal, the second output state voltage when applied enabling the generation of said second switch turn-on signal, said flip-flop developing said first output state voltage upon said initiation of deflection circuit start-up, and means for applying an input signal to said flip-flop to switch said flip-flop into developing said second output state voltage after the elapse of said predetermined inhibit interval.

6. A circuit according to claim 5 wherein said disabling means comprises means for applying an input signal to said flip-flop during steady-state operation of said deflection circuit when sensing a decrease in amplitude of said deflection rate voltage below said predetermined level such that said flip-flop switches into developing said first output state voltage.

7. A circuit according to any one of the preceding claims wherein said input transformer comprises a flyback transformer, said deflection rate voltage comprises a retrace pulse voltage, said first polarity interval comprises the trace interval of a deflection cycle and said alternate polarity interval comprises the retrace interval of a deflection cycle.

8. A circuit according to claim 7 wherein said first and second windings are loosely coupled to each other magnetically to provide sufficient leakage inductance to store within said flyback transformer the energy required to be transferred to said load circuit each deflection cycle.

9. A circuit according to claim 8 wherein said load circuit comprises an ultor load coupled to a high voltage winding of said flyback transformer, said high voltage winding and said second winding being relatively tightly coupled magnetically.

10. A circuit according to claim 9 wherein said regulator switch comprises a silicon controlled rectifier.

11. A circuit according to claim 10 including a rectifier parallelly coupled with and oppositely poled to said silicon controlled rectifier.

12. A circuit according to claim 11 wherein said second switch comprises a silicon controlled rectifier.

13. A regulated horizontal deflection circuit with start-up circuitry, comprising:
   a horizontal deflection winding;
   a trace capacitance for developing a trace voltage;
   a horizontal deflection generator coupled to said deflection winding for applying said trace voltage to said deflection winding to generate scanning current in said deflection winding, a horizontal retrace pulse voltage being developed at a deflection generator terminal;
   a source of mains supply alternating polarity voltage;
   means coupled to said source for rectifying said mains supply voltage to develop a DC operating voltage at an input terminal;
   a controllable regulator switch;
   a DC blocking capacitance;
   a flyback transformer with first and second windings, said first winding being coupled to said input terminal and to said regulator switch for transferring energy from said input terminal to a load circuit coupled to a winding of said flyback transformer other than said first winding in accordance with the conduction time of said regulator switch, said second winding being coupled to said deflection generator terminal and to said DC blocking capacitance;
   a regulator control circuit coupled to said regulator switch for turning on said regulator switch at a controlled instant within the trace interval of each horizontal deflection cycle to draw current in said first winding from said input terminal, the horizontal retrace pulse voltage developed at said deflection generator terminal when applied to said second winding reflecting a resonant current to said first winding to commutate off said regulator switch during the retrace interval of each horizontal deflection cycle;
   means for developing a signal representative of variations of a deflection circuit energy level;
   means for applying said deflection circuit energy level variations representative signal to said regulator control circuit to vary said conduction time of said regulator switch with deflection circuit energy level variations;
   a second controllable switch coupled in the path of the current from said source to said first winding of said flyback transformer;
   a second control circuit coupled to said second switch for generating a second switch turn-on signal to enable current from said source to flow in said first winding;
   means coupled to one of said trace and DC blocking capacitances for precharging said one capacitance to a predetermined level prior to the initial conduction of said regulator switch; and
   means coupled to said second control circuit for enabling said second control circuit to generate said second switch turn-on signal near the zero-crossover instant of said mains supply voltage during deflection circuit start-up to provide a slow start-up of said deflection circuit.

14. A circuit according to claim 13 wherein said precharging means comprises an auxiliary mains supply transformer with a primary winding coupled to said source of mains supply alternating polarity voltage and including a rectifier coupled to said one capacitance and a secondary winding of said auxiliary mains supply transformer.

15. A circuit according to claim 14 including an audio load circuit coupled to a winding of said auxiliary mains supply transformer, said audio load circuit drawing an audio modulated load current from said mains supply source.

16. A circuit according to claims 13, 14 or 15 wherein said enabling means enables said second control circuit to generate said second switch turn-on signal at an instant immediately prior to said zero-crossover instant, said second control circuit including means for phase advancing the occurrence of said second switch turn-on signal from said zero-crossover instant during the transition from start-up to steady-state operation.

17. A circuit according to claim 16 including means responsive to said retrace pulse voltage during steady-state operation of said deflection circuit for disabling generation of said second switch turn-on signal when sensing a decrease in the amplitude of said retrace pulse voltage below a predetermined level.

* * * * *

UNITED STATES PATENT AND TRADEMARK OFFICE
CERTIFICATE OF CORRECTION

PATENT NO. : 4,291,257

DATED : September 22, 1981

INVENTOR(S) : Walter Böhringer

It is certified that error appears in the above-identified patent and that said Letters Patent is hereby corrected as shown below:

On the Cover Page, following the filing date information, insert the following -- Foreign Application Priority Data, Nov. 30, 1979 [GB] United Kingdom...41461/79--. On the Cover Page, in the References Cited section, under U.S. PATENT DOCUMENTS add -- 4,112,465 9/1978 Willis; under FOREIGN PATENT DOCUMENTS add -- 2619499 9/1977 Fed. Rep. of Germany; 2902115 7/1979 Fed. Rep. of Germany; 2948139 6/1980 Fed. Rep. of Germany; 2,016,878 9/1979 Great Britain; 1,481,518 8/1977 Great Britain --.

UNITED STATES PATENT AND TRADEMARK OFFICE
CERTIFICATE OF CORRECTION

PATENT NO. : 4,291,257

DATED : September 22, 1981

INVENTOR(S) : Walter Böhringer

It is certified that error appears in the above—identified patent and that said Letters Patent is hereby corrected as shown below:

Column 9, line 32, "SCR 25" should be -- SCR 27 --.

Figure 3, should appear as shown on the attached sheet.

Signed and Sealed this

First Day of June 1982

[SEAL]

Attest:

Attesting Officer

GERALD J. MOSSINGHOFF

Commissioner of Patents and Trademarks